March 9, 1954
M. SCHWARTZ ET AL
2,671,614
CALCULATING DEVICE FOR USE IN CONNECTION WITH PHOTOFLASH EQUIPMENT
Filed Jan. 22, 1953
2 Sheets-Sheet 1
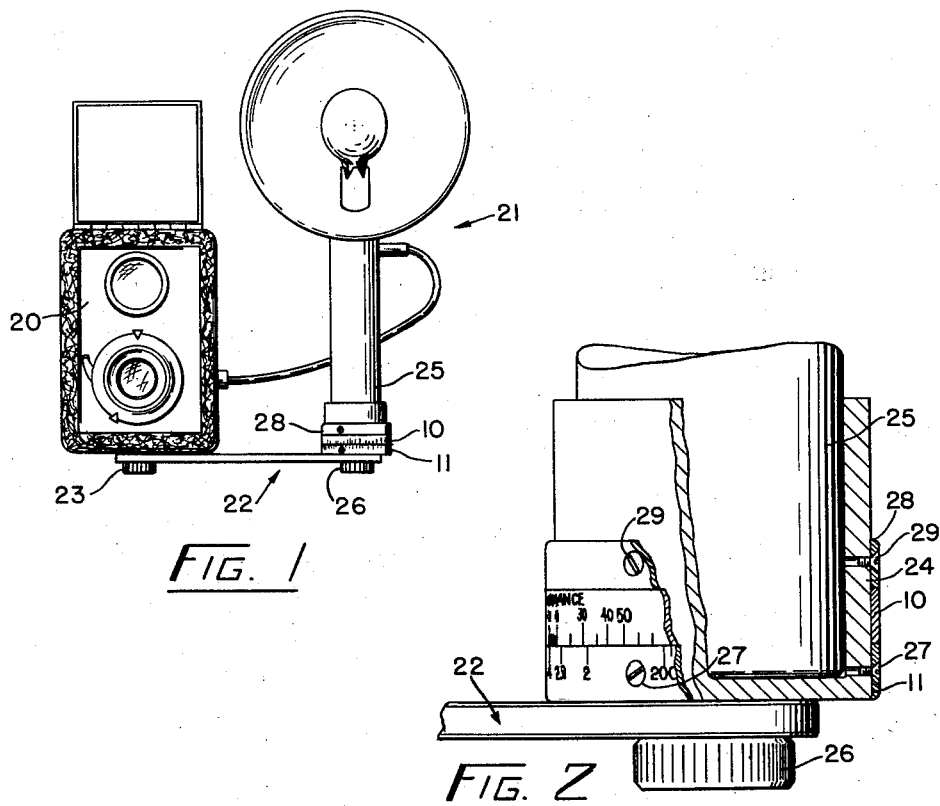
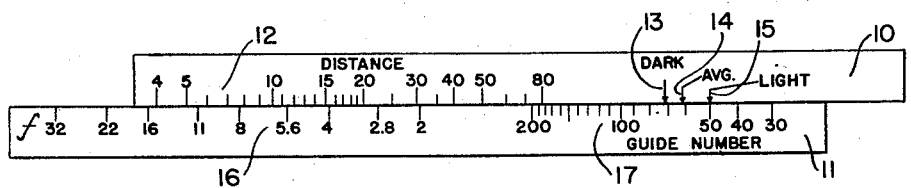
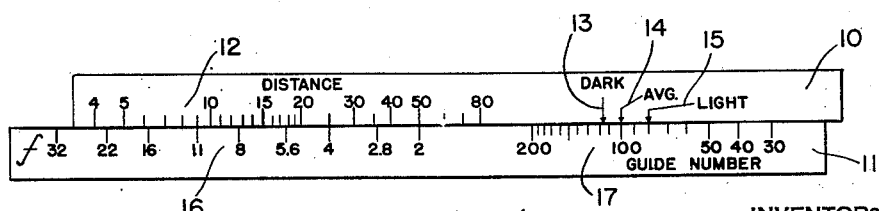
INVENTORS
MORRIS SCHWARTZ
WILLIAM CASTEDELLO
BY
Frederick E. Hane
ATTORNEY

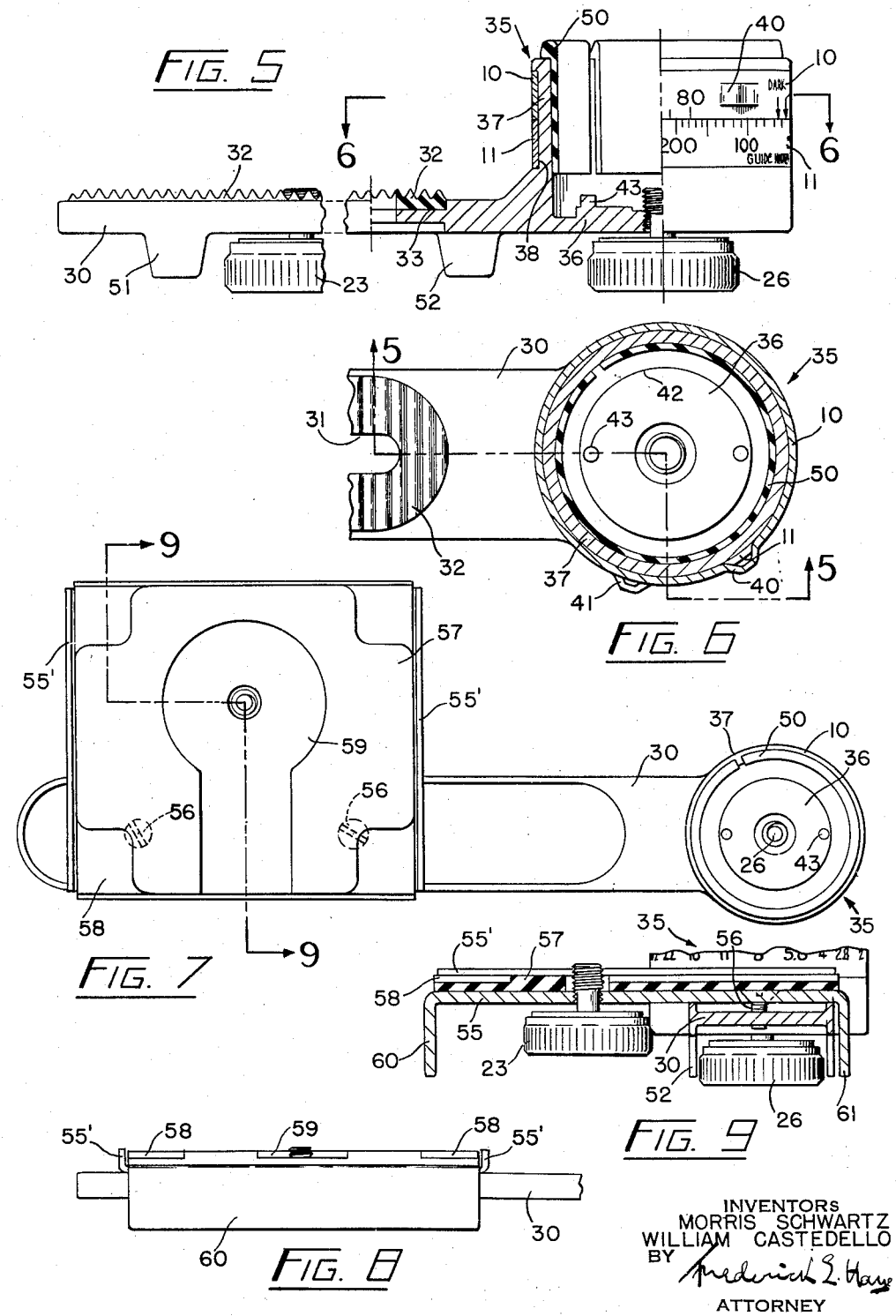

Patented Mar. 9, 1954

2,671,614

UNITED STATES PATENT OFFICE 2,671,614

CALCULATING DEVICE FOR USE IN CONNECTION WITH PHOTOFLASH EQUIPMENT

Morris Schwartz and William Castedello, Plainville, Conn., assignors to The Kalart Company Inc., Plainfield, Conn.

Application January 22, 1953, Serial No. 332,674

7 Claims. (Cl. 235—64.7)

The present invention relates to calculators for determining the camera adjustments required to obtain correctly exposed flash pictures.

Firms manufacturing flash lamps issue so-called guide numbers for different types of flash lamps in relation to films of different sensitivity and to different exposure times. The guide number is a product of the light output of the flash lamp and the sensitivity of the film. For example, the guide number of a flash lamp known as a No. 5 used with film known as Super XX film is 300. This signifies that to obtain a proper flash exposure, the product of the lens aperture—the so-called f-number—and the distance for instance in feet from the subject to the flash lamp must be 300. Thus, proper exposure can be made for example at 20 ft. and f/15 and at 60 feet and f/5. As can be easily seen, in each case the product is 300. However, it is more difficult to determine the correct f-number when odd distances are involved such as 18 ft. or 13 ft. or to ascertain the distance which will be well photographed at a lens aperture of f/8 or f/4.5.

Accordingly, one of the objects of the present invention is to provide a novel calculating device which readily and directly yields all practically useful combinations of distances and f-numbers for a selected guide number.

Another object of the invention is structurally to associate the aforesaid calculating device with equipment used for photoflash work. This affords the advantage that the calculator is always available when and where needed and can be conveniently set while being mounted on the equipment.

A more specific object of the invention is to provide a calculating device structurally combined with the bracket for a photoflash unit.

Still another object of the invention is to provide a mounting of the calculator on the bracket such that the calculator can be conveniently set and read.

A further object of the invention, allied with the preceding ones, is to provide a novel and improved bracket for a photoflash unit which by its design lends itself to a structural combination with a calculator and which also affords a stable and strong support for a flash unit fitted upon the bracket.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawing:

Fig. 1 is an elevational side view of a camera and a flash unit attached to the camera casing by means of a bracket equipped with a calculator according to the invention.

Fig. 2 is a view, partly in section, of the portion of the bracket mounting the calculator on an enlarged scale.

Figs. 3 and 4 are a development of the scales and markers of the calculator shown in different relative positions.

Fig. 5 is a fragmentary sectional side view of a modification of a bracket equipped with a calculator.

Fig. 6 is a section taken on line 6—6 of Fig. 5.

Fig. 7 is a plan view of another modification of a bracket with calculator according to the invention which is designed particularly to support a camera of the reflex type.

Fig. 8 is a fragmentary side view of Fig. 7, and

Fig. 9 is a section taken on line 9—9 of Fig. 7.

Referring first to Figs. 3 and 4 in detail, the exemplification of the calculating device according to these figures comprises two strips 10 and 11 made of any suitable material such as plastic or metal and disposed movably relative to each other in longitudinal direction. Strip 10 bears a scale 12 calibrated in units of distance such as feet and at least one marker representative of the light value of the subject to be photographed. There are shown three markers 13, 14 and 15 representing a dark, an average and a light subject to be photographed. Strip 11 bears a scale 16 calibrated in f-numbers and a scale 17 calibrated in guide numbers.

Let it now be assumed that the proper guide number is 50 and that the operator judges the subject to be a light one. He then places the two strips 10 and 11 in a relative position in which marker 15 is in juxtaposition to guide number 50. This setting is shown on Fig. 3. Then, each figure of the distance scale 12 is in juxtaposition to the correct f-number on the f-number scale 16 and vice versa. For instance at a distance of 15 ft. the proper lens aperture is slightly more than f/4. Similarly, on Fig. 4, the marker 14 for average light of the subject is set on guide number 100. Then, f/11 is proper for a distance of 9 ft., f/2 for a distance of 50 ft. etc. It will now be apparent that by the simple and single operation of moving one of the light markers in juxtaposition with the proper guide number the correct f-number for any given distance can be directly read on scale 16. It will further be apparent that the markers 13, 14 and 15 can also be provided on strip 11 and the guide number scale on strip 10.

It will be evident from the previous description that either both strips may be movably mounted or one strip may be stationary and the other movable. Furthermore, the two scale strips may be mounted as flat strips or they may encompass part of the portion of the equipment upon which they are mounted.

According to the now preferred embodiment of the invention, the two strips are mounted on the bracket of a photoflash unit encircling the part thereof receiving and holding a flash unit but various other mounting arrangements may be easily visualized. For instance, the two strips may be mounted as flat strips longitudinally slidable on the battery casing of a flash unit or they may encircle the casing and be mounted rotatably relative to each other.

Referring now to Figs. 1 and 2 in detail, these figures illustrate a camera 20 shown as a reflex camera which may be of any design and a flash unit generally designated by 21 and attached to the camera casing by means of a bracket generally designated by 22. The bracket is releasably attached to the camera by means of a screw 23 threaded into the tripod hole of the camera. The other end of the bracket is provided with a cup-shaped holder 24 closed at the bottom. This cup receives the cylindrical battery casing 25 of the flash unit. Casing 25 is preferably secured in cup 24 by means of a knurled screw 26 extended through the bottom of cup 24 and into casing 25.

The outer cylindrical wall of cup 24 serves to support scale strips 10 and 11 which encircle the cup wall. As previously explained, both the strips may be rotatable but in the embodiment of Figs. 1 and 2 strip 11 is fixed to the cup by one or more screws 27. The rotatable strip 10 is held in position by a ring 28 secured to cup 24 by one or several screws 29.

The manipulation of the calculating device will be obvious from the previous description. It suffices to state that the strip or rather ring 10 is rotated until the selected marker 13, 14 or 15 is in juxtaposition with the proper guide number.

The bracket according to Figs. 5 and 6 comprises an elongated bar 30 formed with a longitudinally elongated slot 31. Screw 23 for attaching the bracket to the camera casing is slidably retained in the slot to permit a variation of the distance at which the flash unit or more specifically the flash lamp thereof is held relative to the objective of the camera. A preferably corrugated strip of rubber 32 also longitudinally slotted is secured to the top of bar or arm 30 preferably in a shallow recess 33 thereof. This rubber strip serves to obtain a rigid attachment of the bracket to the camera and also to protect the covering of the camera casing.

The casing of a flash unit is supported on the bracket by means of a cup-shaped holder generally designated by 35 closed at the bottom by a wall 36. The cylindrical wall 37 of cup 35 also serves to support on its outside the two scale strips 10 and 11. These scale strips are preferably fitted in a shallow circumferential groove 38 formed in cylindrical wall 37. The two strips are shown as being rotatable relative to each other but one of the strips may also be stationarily mounted as described in connection with Figs. 1 and 2. Furthermore, the scales on one of the strips may be calibrated directly on the material of the cup wall of the bracket according to Figs. 1 and 2 or the bracket according to Figs. 5 and 6. Finally, it will be apparent that instead of retaining the scale strips in the groove 38, the strips may also be retained on the cup wall by means of a collar or ring at the receiving edge of the cup 35.

To facilitate a rotation of the strips, each strip is provided with a protruding nose 40 and 41 respectively.

The bottom 36 of cup 35 is preferably provided with a retaining rim 42 and locating pins 43 which fit corresponding grooves and holes in the bottom of a flash unit to facilitate and secure the correct orientation of the reflector of the flash unit relative to the objective of the camera. A preferably somewhat springy insulation ring 50 may be fitted in the cup to assure a tight seat of the casing of the flash unit in the cup.

The bracket has preferably several legs 51 and 52, the length of which is such that the bracket with a camera and a flash unit attached thereto will rest on a plane surface with the camera in vertical position when screws 23 and 26 are tightened.

The manipulation of the calculating device of Figs. 5 and 6 will be evident from the previous description.

The bracket according to Figs. 7, 8 and 9 is designed specifically for use in connection with a reflex camera. For this purpose a plate 55 is fastened by any suitable means such as rivets or screws 56 to bracket bar or arm 30 which need not to be slotted in this case. The outline of plate 55 corresponds to the outline of the casing of the reflex camera on which the bracket is designed. A plate 57 made of rubber or other suitable flexible material is preferably fastened on plate 55 and held in position by upwardly bent flanges 55' of plate 55. As can best be seen on Fig. 7 plate 57 is formed with shallow recesses 58 at each corner and a centric recess 59. These recesses serve to accommodate the legs and the adjustment screws customarily provided at the bottom of the casing of a reflex camera. Plate 55 is further provided with depending flanges 60 and 61 which together with legs 52 depending from bracket bar 30 permit to rest the entire assembly upon a plane surface.

The cup for holding the casing of a flash unit and the calculating device mounted on said cup are the same as have been described in connection with Figs. 1 and 2 or Figs. 5 and 6.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A bracket for attaching a photoflash unit to the casing of a photographic camera in combination with a calculating device for determining the relation of f-numbers and distances relevant in connection with photoflash exposure, the said calculating device comprising two members, one of said members having thereon a scale calibrated in f-numbers and the other a scale calibrated in units of distance, one member further having thereon a scale calibrated in guide numbers of photoflash lamps and the other at least one marker representing the light value of a subject to be photographed and coacting with the guide number scale, the said members being mounted on said bracket movable relative to each other, and the said scales and the marker thereon being disposed in a spatial relationship in which juxtaposition of said marker with the selected one of said guide numbers by movement of said members relative to each other places each f-number in juxtaposition to the corresponding distance calibration.

2. A bracket according to claim 1, wherein the said members are in form of two strips having thereon in longitudinal spacing said scales.

3. A bracket for a photoflash unit comprising in combination an elongated bar attachable to the casing of a photographic camera, a holder on one end of said bar for detachably supporting the casing of a flash unit, two members mounted on said holder movably relative to each other, one of said members having thereon a scale calibrated in f-numbers and the other a scale calibrated in units of distance, one member having further thereon a scale calibrated in guide numbers and the other at least one marker representing the light value of a subject to be photographed and coacting with said guide number scale, the said members, the said scales and the said marker thereon being disposed in a spatial relationship in which juxtaposition of said marker with a selected one of said guide numbers places each f-number in juxtaposition to the corresponding distance calibration, the said scale members forming on the bracket a calculating device for determining the relation of f-numbers and distances relevant in connection with photoflash exposure.

4. A bracket according to claim 3, wherein the said holder includes a cylindrical wall member, and wherein the said scale members are in form of strips mounted on said cylindrical wall slidably relative to each other.

5. A bracket according to claim 4, wherein the said strips encircle said holder and are disposed thereon side by side, respective scales facing each other.

6. A bracket according to claim 5, wherein the said holder comprises a cup-shaped member closed at the bottom and the side wall of which is formed by said cylindrical wall member supporting the scale strips, and wherein a screw is mounted in the bottom of said cup penetrating the same for securing the casing of a flash unit in said cup.

7. A bracket according to claim 6, wherein the wall of said cup is formed with a circumferential shallow groove in which said strips are fitted rotatably relative to each other, and wherein each of said strips is provided with a protruding nose for effecting relative rotation of said strips.

MORRIS SCHWARTZ.
WILLIAM CASTEDELLO.

References Cited in the file of this patent

UNITED STATES PATENTS

| Number | Name | Date |
|---|---|---|
| D. 165,783 | Pennock et al. | Jan. 29, 1952 |
| 456,869 | Watkins | July 28, 1891 |
| 1,152,028 | Knobloch | Aug. 31, 1915 |
| 1,864,180 | Bing | June 21, 1932 |
| 2,034,027 | Decary et al. | Mar. 17, 1936 |
| 2,467,591 | Lidfelt et al. | Apr. 19, 1949 |
| 2,513,878 | Kelley et al. | July 4, 1950 |
| 2,517,590 | Mundorff | Aug. 8, 1950 |
| 2,614,471 | Markowitz | Oct. 21, 1952 |
| 2,644,380 | Mendelsohn | July 7, 1953 |
| 2,644,381 | Mendelsohn | July 7, 1953 |

OTHER REFERENCES

"Special Slide Rules" by J. N. Arnold, pages 19–29; published by Purdue University of LaFayette, Indiana in 1933.

"Photo Technique" of December 1939; pages 41 and 42; published by McGraw-Hill Publishing Co. of 330 W. 42nd St., New York.

"The Camera Magazine" pages 108, 109, and 114; September 1951.